US009849798B2

(12) United States Patent
Barbul et al.

(10) Patent No.: US 9,849,798 B2
(45) Date of Patent: Dec. 26, 2017

(54) POSITIONING WITH A RADIO-BASED LOCKING SYSTEM

(71) Applicant: Bayerische Motoren Werke Aktiengesellschaft, Munich (DE)

(72) Inventors: Andreas Barbul, Munich (DE); Josef Krammer, Holzkirchen (DE); Jens Berger, Munich (DE); Helmut Wagatha, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 290 days.

(21) Appl. No.: 14/615,656

(22) Filed: Feb. 6, 2015

(65) Prior Publication Data

US 2015/0175025 A1    Jun. 25, 2015

Related U.S. Application Data (63) Continuation of application No. PCT/EP2013/066251, filed on Aug. 2, 2013.

(30) Foreign Application Priority Data

Aug. 9, 2012  (DE) .................. 10 2012 214 201

(51) Int. Cl.
  *H02J 7/00*   (2006.01)
  *B60L 11/18*  (2006.01)
  (Continued)

(52) U.S. Cl.
  CPC ......... *B60L 11/1829* (2013.01); *B60L 11/182* (2013.01); *B60L 11/1833* (2013.01);
  (Continued)

(58) Field of Classification Search
  USPC ........................................................ 320/108
  See application file for complete search history.

(56) References Cited

U.S. PATENT DOCUMENTS 8,111,141 B1      2/2012 Brand et al.
2008/0129477 A1   6/2008 Takahashi et al.
(Continued)

FOREIGN PATENT DOCUMENTS

CN       102104435 A      6/2011
DE  10 2007 041 783 B3    4/2009
(Continued)

OTHER PUBLICATIONS

Chinese Office Action issued in Chinese counterpart application No. 201380041753.0 dated Mar. 15, 2016, with English translation (Ten (10) pages).
(Continued)

*Primary Examiner* — Samuel Berhanu
(74) *Attorney, Agent, or Firm* — Crowell & Moring LLP (57) ABSTRACT

An access control device of a vehicle is configured to detect the spatial position of the access element of the vehicle safety unit relative to the vehicle via electromagnetically detecting the distances and angles between several low-frequency transmitting antennas of the vehicle safety unit and the low-frequency receiver of the access element. The access control device is also configured to detect the location position of an external induction charging unit relative to the vehicle via electromagnetically measuring the distance and angle between at least two transmitting antennas of several low-frequency transmitting antennas and at least one receiving antenna of the induction charging unit.

8 Claims, 2 Drawing Sheets

(51) Int. Cl.
  *B60R 25/24* (2013.01)
  *G01S 13/87* (2006.01)
  *H01Q 1/32* (2006.01)
  *H01Q 7/00* (2006.01)
  *H01Q 21/28* (2006.01)
  *G01S 13/46* (2006.01)
  *G01S 13/76* (2006.01)
  *G01S 13/78* (2006.01)
  *G01S 13/82* (2006.01)
  *G01V 3/10* (2006.01)

(52) U.S. Cl.
  CPC ............ *B60R 25/245* (2013.01); *G01S 13/46* (2013.01); *G01S 13/765* (2013.01); *G01S 13/767* (2013.01); *G01S 13/787* (2013.01); *G01S 13/825* (2013.01); *G01S 13/878* (2013.01); *G01V 3/10* (2013.01); *H01Q 1/3208* (2013.01); *H01Q 1/3241* (2013.01); *H01Q 7/00* (2013.01); *H01Q 21/28* (2013.01); *B60L 2230/16* (2013.01); *B60L 2240/62* (2013.01); *B60L 2250/16* (2013.01); *G01S 13/788* (2013.01); *G01S 2013/466* (2013.01); *G07C 2209/63* (2013.01); *Y02T 10/7005* (2013.01); *Y02T 10/7088* (2013.01); *Y02T 10/7291* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/162* (2013.01); *Y02T 90/163* (2013.01)

(56) References Cited

U.S. PATENT DOCUMENTS

| | | |
|---|---|---|
| 2009/0085522 A1 | 4/2009 | Matsumoto |
| 2012/0095617 A1 | 4/2012 | Martin |
| 2012/0098483 A1 | 4/2012 | Patel |
| 2012/0262002 A1* | 10/2012 | Widmer ............... H04B 5/0037 307/104 |
| 2013/0257370 A1* | 10/2013 | Ichikawa ............... H02J 5/005 320/108 |

FOREIGN PATENT DOCUMENTS

| | | |
|---|---|---|
| DE | 10 2008 055 881 A1 | 5/2010 |
| EP | 0 984 123 A2 | 3/2000 |
| EP | 2 338 704 A1 | 6/2011 |
| JP | 2008-94303 A | 4/2008 |
| JP | 2010-60457 A | 3/2010 |
| JP | 2010-183804 A | 8/2010 |
| WO | WO 2008/044092 A1 | 4/2008 |
| WO | WO 2009/109575 A1 | 9/2009 |
| WO | WO 2011/006884 A2 | 1/2011 |
| WO | WO 2011/127455 A2 | 10/2011 |
| WO | WO 2012/082858 A1 | 6/2012 |

OTHER PUBLICATIONS

International Search Report dated Nov. 5, 2013 (Three (3) pages).
German Search Report dated Nov. 30, 2012, with Statement of Relevancy (Six (6) pages).

* cited by examiner

POSITIONING WITH A RADIO-BASED LOCKING SYSTEM

CROSS REFERENCE TO RELATED APPLICATIONS

This application is a continuation of PCT International Application No. PCT/EP2013/066251, filed Aug. 2, 2013, which claims priority under 35 U.S.C. §119 from German Patent Application No. 10 2012 214 201.0, filed Aug. 9, 2012, the entire disclosures of which are herein expressly incorporated by reference.

BACKGROUND AND SUMMARY OF THE INVENTION

The invention relates to a system comprising a vehicle having an automatic radio-based vehicle safety unit and having an access control device, and comprising an access element assigned to the vehicle safety unit, the vehicle safety unit having several low-frequency transmitting antennas, and the access element having a low-frequency receiver, and by means of the access control device, the spatial position of the access element relative to the vehicle being detectable by means of the principle of electromagnetic distance and angle measuring between the transmitting antennas and the receiver.

According to the state of the art, such as European Patent Document EP 0 984 123 A2, automatic radio-based vehicle safety units are utilized for the control or authentication of an access element. The access element is usually a radio key, by which a user of a certain vehicle can procure access to this vehicle without actively using the key assigned to this vehicle. These vehicle safety units are therefore also called radio-based locking systems.

Furthermore, in the case of modern radio-based locking systems, the vehicle cannot be locked when the radio key is situated in the vehicle interior by being spatially located by way of the locking system.

Vehicles having an electrified drive train usually have a charging interface to an external charging source. The transmission of electric power in order to, for example, charge an electro-chemical energy accumulator of the vehicle, usually takes place in a wired or inductive manner.

In the case of wired charging methods, the vehicle has to be connected by way of a charging cable with the external charging source, such as a charging station, in order to carry out a charging operation. In the case of inductive charging methods, the power transfer takes place by way of an electromagnetic exciter field of a vehicle-external primary coil to a vehicle-side secondary coil by way of electromagnetic induction at the secondary coil. The transmission efficiency of the electric power in this case is a function of the relative spatial position of the secondary coil with respect to the primary coil. In a preferred position area of the secondary coil relative to the primary coil, the fraction of the exciter power, which occurs as a power loss during the charging, is approximately minimal.

The object of the prior art is bringing the secondary coil into the charging position. International Patent Document WO 2011/006884 A2, for example, describes an electronic positioning aid for a vehicle having a primary coil, which positioning aid utilizes the reflection characteristics of a housing of the primary coil situated on the ground.

It is an object of the invention to describe an improved system, comprising a vehicle having an automatic radio-based vehicle safety unit and having an access control device, and comprising an access element assigned to the vehicle, the vehicle having several low-frequency transmitting antennas, and the access element having a low-frequency receiver, and by means of the access control device, the spatial position of the access element relative to the vehicle being detectable by means of the principle of electromagnetic distance and angle measuring between the transmitting antennas and the receiver.

Advantageous embodiments and further developments of the invention are contained in the dependent claims.

According to the invention, the system comprises a vehicle-external induction charging unit having a primary coil, in which case, the vehicle has a secondary coil for the inductive charging of the vehicle at the induction charging unit, and the induction charging unit has at least one low-frequency receiving antenna, and the access control device can carry out a detection of the location position of the induction charging unit relative to the vehicle by means of the principle of electromagnetic distance and angle measuring between at least two transmitting antennas of several low-frequency transmitting antennas and the at least one receiving antenna.

This means that two low-frequency transmitting antennas of the vehicle, which are operated by the access control device, in addition to the localization of the access element, can also be used for distance and angle measuring with the at least one receiving antenna of the induction charging unit. In this manner, the vehicle-external induction charging unit can be spatially located by way of components of the locking system of the vehicle and the access control device. This permits a location position determination of the induction charging unit relative to the vehicle.

According to a preferred embodiment of the invention, the secondary coil for the inductive charging takes up a charging position which is situated in a preferred spatial position area with respect to the primary coil. For establishing the charging position, the system further detects, by means of the location position and the charging position, at least a partial travel trajectory, along which the charging position can be taken up by the secondary coil.

In the preferred position area, the fraction of the exciter power, which occurs as a power loss during the charging, is approximately minimal.

Furthermore, it is useful for the access control device to drive the at least two transmitting antennas, for the access control device to comprise a first high-frequency communication unit, for the induction charging unit to have an induction control device, for the induction control device to comprise a second high-frequency communication unit, for the induction control device to be assigned to the at least one receiving antenna as measuring unit of the electromagnetic distance and angle measuring and to measure the induction signals of the at least one receiving antenna, for the induction signals to be transmissible from the induction control device to the access control device, and for the access control device as the arithmetic unit to detect the location position by triangulation by means of the induction signals.

The access control device therefore operates at least two transmitting antennas of the radio-based locking system in order to carry out angle and distance measuring between the transmitting antennas and with the at least one receiving antenna. According to preferred further developments, the charging unit has precisely one receiving antenna or precisely two receiving antennas. The measured induction signal can be sent by the induction control devices to the access control device. The measured induction signal is used as an input variable for the access control device in order to calculate the location position by triangulation.

According to a further embodiment of the invention, the access control device or a further control device of the vehicle detects the travel trajectory by means of the location position, the vehicle automatically carrying out a driving maneuver corresponding to the travel trajectory, or the vehicle informing a driver of the vehicle by way of a suitable human-machine interface of a driving maneuver corresponding to the travel trajectory.

The notification of the driver can take place, for example, by a fading of a steering recommendation into a head-up display of the vehicle or by a language statement, which can be compared with a language statement of a navigation system of the vehicle.

For implementing a driving maneuver, the driver is therefore assisted by way of a human-machine interface by emitted instructions (for example, "steer left), or the trajectory is used as an input variable for a driver assistance system which moves the vehicle automatically into the charging position.

According to a further embodiment of the invention, the first high-frequency communication unit first sends out a coded search signal. After the reception of the search signal by the induction control device, the second high-frequency communication unit sends a coded confirmation signal to the access control device. The reception of the confirmation signal triggers an initialization routine between the at least one transmitting antenna and the at least one receiving antenna, which is carried out by the access control device and by the induction control device. After the initialization routine, the at least two transmitting antennas will emit a coded electromagnetic positioning signal, the magnetic fraction of the positioning signal having a specified field orientation or a specified field intensity with respect to the vehicle coordinate system. The at least one receiving antenna receives the at least two positioning signals of the at least two transmitting antennas, and the induction control unit measures a magnetic field vector for each positioning signal, which magnetic field vector is clearly assigned to one of the at least two transmitting antennas by means of the coding of the position signal. The magnetic field vector is transmitted as a measured induction signal from the induction control device to the access control device. According to a triangulation method, the access control device computes the local position of the transmitting antennas with respect to the receiving antennas, which clearly describes the location position. Furthermore, the access control device or a further control device of the vehicle detects at least a partial travel trajectory, along which the location position can be approximated to the charging position.

When a driving maneuver takes place after the detection of the travel trajectory, the determination of the location position will be repeated in real time, in order to update the travel trajectory. When the charging position has been reached, the updated travel trajectory describes a stopping maneuver. The vehicle comes to a stop during a stopping maneuver The invention is based on the considerations described in the following:

In a plurality of applications, it is the goal to determine the distance of an object (for example, a vehicle) with respect to another object (for example, a vehicle key). Radio technology in the high-frequency and low-frequency band here offers possibilities to do so in a wireless manner by means of measuring field intensities and run times of electromagnetic alternating fields. One example are modern radio-based locking systems of vehicles, such as a keyless access, in the case of which the vehicle acts as a transmitter and the vehicle key acts as a receiver.

Modern locking systems of vehicles provide the user with a comfortable access to the vehicle. These are automatic systems by means of which a vehicle can be unlocked without any active use of a car key. The presence of the car key within a specified relative local area around the vehicle is sufficient for the unlocking. As soon as the key approaches the vehicle up to a locally sensitive area, a coded query signal with a frequency in the low-frequency range is emitted by way of several antennas distributed in the vehicle. The locking system will then go into a receiving mode in the ultrahigh-frequency range in order to possibly receive a confirmation signal of the vehicle key. If the vehicle key, equipped with an RFID transponder, with a 3d coil or with a combination of three coils, is within the range of transmission, the query signal will be received and decoded by the key. The key will then send out the confirmation signal with a new coding in the ultrahigh-frequency range. If the confirmation signal "fits", the vehicle will be unlocked.

In an inverse application case, the vehicle cannot be locked if the vehicle key is within a specified local area which may, for example, be the occupant compartment or the trunk, in order to prevent an accidental locking-in of the vehicle key.

It is suggested to use the locking system of the vehicle for determining the location position of a vehicle-external inductive charging unit for a vehicle with an electrified drive train. For this purpose, at least two clearly identifiable electromagnetic transmitter signals of antennas of the locking system are used in order to receive, at a receiver of the vehicle-external charging unit, signals from at least two different transmitter positions for angle and distance measuring. By triangulation, a clear conclusion can then be drawn concerning the position of the receiver with respect to the transmitter. By way of the same radio system, in addition, on the same frequency or on a different frequency, preferably in the high-frequency band, communication signals (for example, for the position description) can be exchanged between the at least 2 transmitters and the receiver.

The transmitters are integrated in the or at the vehicle, and the receiver is accommodated at the primary coil. By means of triangulation, a clear conclusion can be drawn concerning the position of the transmitter with respect to the receiver. By way of the same radio system, in addition, communication signals (for example, position data) on the same frequency or another frequency can be exchanged between the two transmitters and the receiver.

This permits a clear position determination with respect to transmitter and receiver of a high precision by several input signals and triangulation.

Depending on the vehicle type, the radio-based locking system has a defined number of transmitting coils by which an electromagnetic low-frequency field is generated, which is measured by a preferably three-dimensional coil or a combination of three individual coils, which covers three orthogonal spatial directions, in the vehicle access key. As a result, the distance of the key from the transmitting coil can be determined. By way of several transmitting coils in the vehicle, the actual spatial position of the radio key with respect to the vehicle can be determined. This indicates whether the key is situated outside or inside the vehicle. This information is useful for several applications in the vehicle, such as locking and opening the vehicle, or for the switch-on prevention in the case of an automatic engine start-stop function. This information can also be skillfully used for inductive charging systems of chargeable vehicles.

For the inductive charging, an optimal positioning of the vehicle-side coil, the secondary coil, in the spatial reference to the infrastructure-side coil, the primary coil, is necessary for a maximal power transmission efficiency during wireless charging. The radio-based locking system is used as a positioning system for the vehicle by the triangulation method. For this purpose, preferably at least two transmitting coils of the radio-based locking system are used on the vehicle side. An inductive charging station outside the vehicle has at least one receiver, which preferably has a three-dimensional design but, as an alternative, may have a one-dimensional design. Preferably, the receiver of the inductive charging station or the receivers of the inductive charging station correspond to the receiver in the radio key.

This has the special advantage that components of already existing radio-based locking systems can be used for the positioning (transmitter coils and their triggering for the position determination). The already installed transmitting coils of the locking system are utilized and are addressed by way of the existing access control device by way of the data bus. The transmitting antennas send a low-frequency signal with the desired parameters.

The utilization of the transmitting coils of the radio-based locking system results in a functional installation-space-neutral and weight-neutral expansion of the vehicle, without integrating further hardware in the vehicle for implementing this function.

By means of the attached drawings, a preferred embodiment of the invention will be described in the following. These drawings indicated further details, preferred embodiments and developments of the invention.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, the same reference numbers describe identical technical characteristics. A vehicle with an electrified drive train can be wirelessly charged at an inductive charging station. In the embodiments, a vehicle 1 having an electrified drive train is schematically illustrated. This may be a hybrid or electric vehicle, possibly also a plug-in hybrid vehicle, if the latter, in addition to an interface for the wired charging, also has a charging interface for inductive charging. The vehicle comprises a vehicle-side charging structure for wireless inductive charging, in which case, the charging architecture as a central vehicle-side component, has a secondary coil 2.

In addition, the vehicle has a radio-based locking system with an access control device 22. The radio-based locking system comprises at least two low-frequency antennas 5, 6 which can be operated by the access control device. Furthermore, a radio key 30, which may be situated inside or outside the vehicle, is part of the radio-based locking system. The radio key has a low-frequency receiver that is sensitive in all three spatial directions. This receiver is therefore called a 3d receiver. The radio-based locking system permits a "keyless" access to the vehicle and prevents a locking-out of vehicle users by preventing the locking of the vehicle when the key is situated in the vehicle. The access to the vehicle as well as the locking block take place by locating the key with respect to the spatial dimensions of the vehicle. The position determination takes place by a distance determination by way of the at least two low-frequency antennas of the vehicle and the 3d receiver of the key.

A charging unit 3 for the inductive charging of a vehicle with an electrified drive train is situated outside the vehicle. The main component of the charging unit is a primary coil 4. The charging unit may be suitable for charging a plurality of vehicles, in which case, only a single vehicle can be charged at the primary coil at a certain point in time. The primary coil is mechanically fixedly integrated in the charging unit. The charging station is stationarily situated in or on the ground. In addition, the charging unit has an induction control device 22.

A charging operation is any time period between an initialization operation of the charging connection and a termination operation of the charging connection. The charging operation comprises particularly those points in time at which electric power is transmitted or at least can be transmitted from the primary coil to the secondary coil.

It is a prerequisite for a charging operation that the secondary coil is in the charging position, i.e. is situated within a defined spatial area relative to the primary coil. This spatial area is characterized such that a specified geometrical reference point of the secondary coil, which is a function of the configuration of the secondary coil, deviates from a specified geometrical reference point of the primary coil, which is a function of the configuration of the primary coil, with respect to the three spatial directions, which forms the vehicle-related coordinate system known to the person skilled in the art, only up to a specified tolerance dimension for each of the three spatial directions. By way of the transmission efficiency of electric power between the primary coil and the secondary coil, an optimal charging position is reached.

When the reference point of the secondary coil relative to the reference point of the primary coil is situated such that the distance between these two reference points relative to each of the three spatial directions does not exceed the tolerance dimension specified for the respective axis, the secondary coil will be in the charging position. Because of the fact that the secondary coil is mechanically fixedly situated at the vehicle or is integrated in the vehicle, if the secondary coil is in the charging position, the vehicle is also in a vehicle charging position. Since, within the scope of this document, with respect to its technical effect, the vehicle charging position is synonymous with the charging position, in a simplifying manner, the term "charging position" also applies to the vehicle charging position.

In order to initialize a charging operation, it is therefore necessary to bring the vehicle into the specified charging position. In the described embodiments, this takes place by a movement of the vehicle. In this case, it is essential to determine the position of the vehicle and thus the position of the secondary coil relative to the charging unit and therefore to the primary coil. In the embodiments, this takes place by distance and angle measuring by means of the triangulation method. The measuring is based on the acquisition of the magnetic field vector of a defined electromagnetic field generated by means of an antenna. If the antenna is further developed as a one-dimensional antenna, the received magnetic field vector is acquired at the location of the receiver as a one-dimensional vector, i.e. as a scalar.

A first embodiment will be described by means of FIGS. 1 and 2. In this case, two transmitting antennas are used in the vehicle, and two receiving antennas are used in the charging unit. The two transmitting antennas are operated by the access control device, and the two receiving antennas are operated by the induction control device.

According to the first embodiment, preferably the transmitting antennas, also called "transmitters", are low-frequency antennas, and the receiving antennas, called "receivers", preferably are low-frequency receivers. The transmitters and the receivers operate in a frequency range of below 150 kHz, a preferred frequency band being at approximately 125 kHz, with no limitation of generality.

Figure 1:
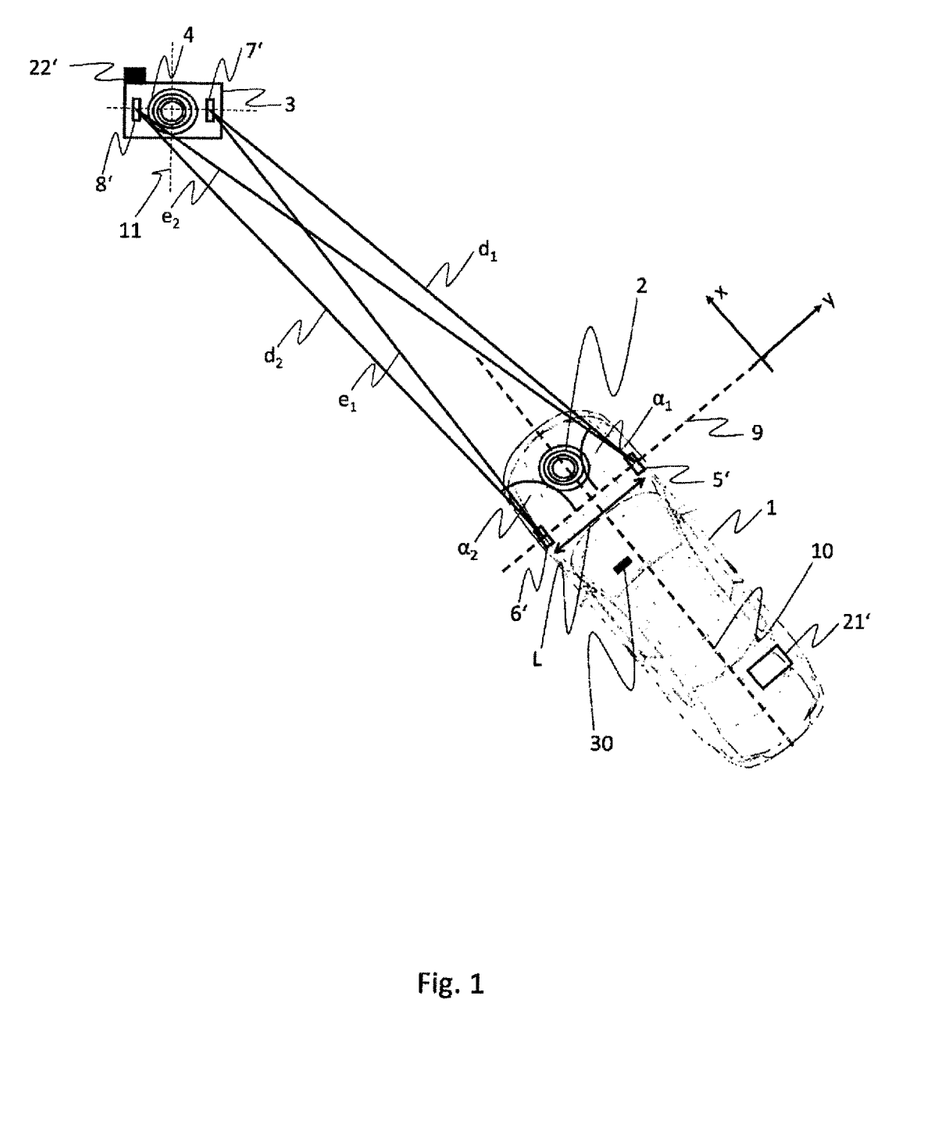
FIG. 1 is a schematic view of a positioning with a locking system by means of triangulation having two transmitters at a vehicle and two receivers at a charging unit.

By means of FIG. 1, the first embodiment describes the location determination of the vehicle, the two transmitting antennas and the access control device being integrated in the vehicle as part of the radio-based locking system, and the two receivers as well as the induction control device being integrated in the charging unit. The antenna 5 is the first transmitting antenna; the antenna 6 is the second transmitting antenna. The receiver 7 is the first receiver; the receiver 8 is the second receiver.

According to this embodiment, the access control device comprises a first communication unit, and the induction control unit comprises a second communication unit. Both communication units can exchange information signals in the high-frequency range in a preferred frequency band of the broadcast narrow-band radio communications at 433 MHz or 868 MHz. As an alternative, higher-frequency bands in the GHz range can be used, for example, according to WLAN or Bluetooth standards. These information signals are especially coded, so that a signal sent by a communication unit can clearly be assigned to the latter. Both communication units can send and receive information signals.

In order to establish the charging position according to the first embodiment or according to the second embodiment, the basic communication is to be established first between the two communication units and thereby between the vehicle and the charging unit. For this purpose, at least one communication unit sends out, at regular intervals of fewer than 10 seconds, a coded high-frequency search signal with a searching range of up to 100 meters with respect to the sensitivity threshold of the receiving communication unit. As an alternative, the interval of the sending of the search signal is inversely proportionally linked with the speed of the vehicle. As soon as the receiving communication unit receives the search signal, the communication unit receiving the search signal sends out a coded confirmation signal with a range that corresponds to the searching range, to the communication unit sending the search signal. Provided that the confirmation signal is received by the communication unit sending the search signal, the basic communication between the communication units is established, and the vehicle is situated with respect to the charging unit at least within a distance that is not greater than the searching range. The communication unit of the charging station will send no signals if the charging station is not available for a charging operation, for example, when it is used by another vehicle. The vehicle will therefore at first be in a so-called rough position with respect to a charging unit currently usable for the charging.

In the rough position, the basic communication connection exists between the vehicle and the charging unit by means of the two communication units. As a result of the coding of the search signal and the confirmation signal, it is guaranteed that the communication between the vehicle and the charging unit is unambiguous. This means that if, for example, there are several charging units of the same type for several vehicles having the same type of architecture, a communication exists between a specific vehicle of these several vehicles and a specific charging unit of these several charging units, and this specific vehicle is in a rough position with respect to the specific charging unit.

When the basic communication is established in the rough position, additional information can be exchanged between the two communication units. In particular, the positioning of the vehicle can be initialized by means of triangulation. For the initialization, the access control device can direct an inquiry to the driver of the vehicle by way of a suitable human-machine interface (MMS) as to whether the establishment of the charging position with respect to the charging unit, with which there is basic communication, is to take place. If this is confirmed by the driver of the vehicle in a suitable manner, which is not the object of this document, the positioning of the vehicle will be initialized by triangulation.

According to the first embodiment, the initialization is the triggering of the transmitters by the induction control device and the triggering of the receivers by the access control device as well as a connection establishment of the transmitters with the receivers in the low-frequency range. In this case, the signal emitted by the transmitters is coded in order to ensure an unambiguous assignment between the transmitters and receivers, i.e. between the vehicle and the charging unit. This can be made possible, for example, by an 8-bit coding.

It is also conceivable that the initialization is based on a simplified mutual recognition of the vehicle and the charging unit when a specific vehicle and a specific charging unit are fixedly coupled with one another, which a person skilled in the art knows as pairing.

After the initialization, the actual location determination will take place by triangulation. For this purpose, the transmitters each send out an electromagnetic signal of defined field intensity, which is called a positioning signal. The range of the positioning signal exceeds the searching range. The positioning signal of the first transmitter 5 is called a first positioning signal. The positioning signal of the second transmitter 6 is called a second positioning signal.

As a result of the installation position of the transmitters in the vehicle, the magnetic field vector of the positioning signals in each case oscillates along a specific spatial preferred axis, and the magnetic field has a preferred propagation direction. According to this embodiment, without any limitation of generality, the preferred axis is situated in a first approximation along the x-axis of the vehicle-related coordinate system known to the person skilled in the art of the vehicle situated in the rough position and the propagation direction in the z-axis of the vehicle situated in the rough position.

The receivers in the charging unit have such an installation position that the receivers in the x-y plane of the vehicle-related coordinate system of the vehicle situated in the rough position have the highest reception sensitivity with respect to a magnetic field and therefore the highest measuring precision.

As an alternative, three-dimensional receivers with a three-dimensional reception characteristic, which correspond to the 3d receiver of the radio key and which are characterized along all three spatial axes by a comparable measuring precision, can also be used as well as three-dimensional transmitters. This means that the transmitters have a three-dimensional emission characteristic. The following one-dimensional approach can analogously be applied to additional spatial dimensions in the case of a three-dimensional emission characteristic and a three-dimensional reception characteristic.

Without limiting generality, in the following, one-dimensional transmitters and one-dimensional receivers are used as the basis. The field intensity of the first positioning signal and thus a first magnetic field vector $H_1$ is unambiguously defined by a first transmitter current $I_1$, by a first winding number $N_1$ as well as by the radius $r_1$ of the first transmitter. The field intensity of the second positioning signal and thus a second magnetic field vector $H_2$ is unambiguously defined by a second transmitter current $I_2$, by a first winding number $N_2$ as well as by the radius $r_2$ of the second transmitter.

The two receivers are installed at a distance L in the vehicle, which distance is perpendicularly oriented on the longitudinal vehicle axis 10 and along a parallel 9 of the transverse vehicle axis.

The first receiver detects the first magnetic field vector $H_1$ at the location of the first receiver. The induction control device evaluates the receiver and detects a measuring signal $H_{1,x1}$, which indicates the field intensity of the first magnetic field at the location of the first receiver with respect to the x-direction in the vehicle coordinate system.

The second receiver detects the first magnetic field vector $H_1$ at the location of the second receiver. The induction control device evaluates the second receiver and detects a measuring signal $H_{1,x2}$, which indicates the field intensity of the first magnetic field at the location of the second receiver with respect to the x-direction in the vehicle coordinate system.

The first receiver detects the second magnetic field vector $H_2$ at the location of the first receiver. The induction control device evaluates the receiver and detects a measuring signal $H_{2,x1}$, which indicates the field intensity of the second magnetic field at the location of the first receiver with respect to the x-direction in the vehicle coordinate system.

The second receiver detects the second magnetic field vector $H_2$ at the location of the second receiver. The induction control device evaluates the second receiver and detects a measuring signal $H_{2,x2}$, which indicates the field intensity of the second magnetic field at the location of the second receiver with respect to the x-direction in the vehicle coordinate system.

At a specified point in time $t_1$, the time-dependent measuring signals are acquired as $H_{1,x1}(t_1)$, $H_{1,x2}(t_1)$, $H_{2,x1}(t_1)$ and $H_{2,x2}(t_1)$ and are processed by the induction control device or transmitted to the access control device and processed by the access control device. In the case of this signal processing, the position of the vehicle at the point in time $t_1$ is detected by triangulation.

The length $d_1$, which describes the distance between the first transmitter and the first receiver is obtained as:

$$d_1(t_1) = \sqrt{-r^2 + \left(\frac{2H_{1,x1}(t_1)}{N_1 I_1 r_1^2}\right)^{\frac{2}{3}}}$$

The length $e_2$, which describes the distance between the first transmitter and the second receiver, is obtained as:

$$e_2(t_1) = \sqrt{-r_1^2 + \left(\frac{2H_{1,x2}(t_1)}{N_1 I_1 r_1^2}\right)^{\frac{2}{3}}}$$

The angle $\alpha 1$ between the length $d_1$ and the length L, is obtained as:

$$\alpha_1(t_1) = \arccos\left(\frac{e_2(t_1)^2 - d_1(t_1)^2 - L^2}{-2d_1(t_1)L}\right)$$

As a result of the determination of $d_1$, $e_2$, and $\alpha_1$ at the point in time $t_1$, the location position of the vehicle relative to the charging unit is unambiguously determined.

Further variables can be detected by means of triangulation. The length $d_2$, which describes the distance between the second transmitter and the first receiver, is obtained as:

$$d_2(t_1) = \sqrt{-r_2^2 + \left(\frac{2H_{2,x1}(t_1)}{N_2 I_2 r_2^2}\right)^{\frac{2}{3}}}$$

The length $e_1$, which describes the distance between the second transmitter and the first receiver, is obtained as:

$$e_1(t_1) = \sqrt{-r_2^2 + \left(\frac{2H_{2,x1}(t_1)}{N_2 I_2 r_2^2}\right)^{\frac{2}{3}}}$$

The angle $\alpha_2$ between the length $d_2$ and the length L is obtained as:

$$\alpha_2(t_1) = \arccos\left(\frac{e_1(t_1)^2 - d_2(t_1)^2 - L^2}{-2d_2(t_1)L}\right)$$

The signal processing further comprises the calculation of a travel trajectory of the vehicle, along which travel trajectory, starting from the location position of the vehicle, at the point in time $t_1$, the vehicle can be moved into the charging position. The calculation of the travel trajectory will not be described here in detail.

Starting from the point in time $t_1$, at a repetition rate of at least 10 Hz, the position of the vehicle at later points in time $t_n$ is determined, and the travel trajectory is updated starting from the location position of the vehicle at the point in time tn.

Figure 2:
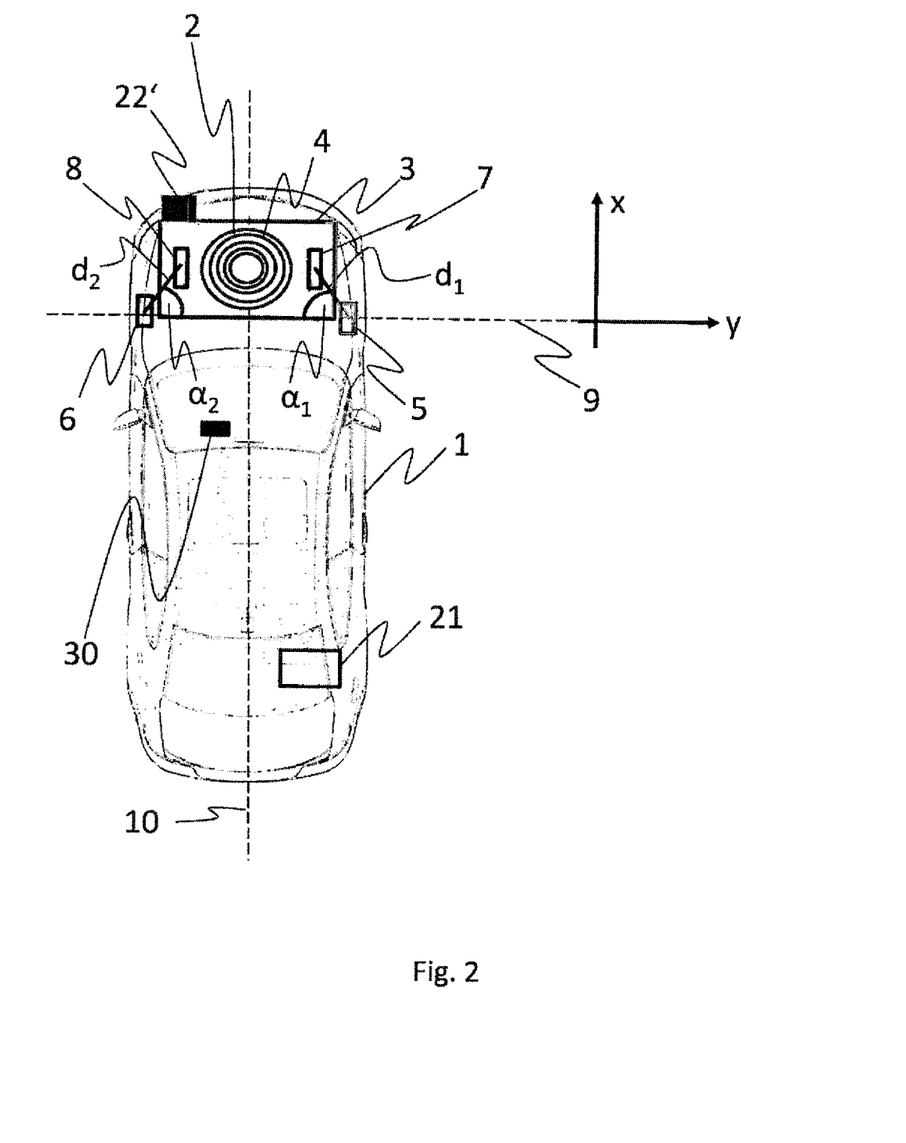
FIG. 2 is a schematic view of an established charging position.

FIG. 2 illustrates the charging position for the first embodiment. The charging position will be established by the described arrangement of the transmitters in the vehicle and of the receivers in the charging unit respectively when the length $d_1$ between the first transmitter and the first receiver describes the same distance as the length $d_2$ between the second transmitter and the second receiver. This same distance corresponds to a specified desired distance d, which describes the setting of the charging position and which is filed in the access control device and/or induction control device. Furthermore, the two angles $\alpha_1$ and $\alpha_2$ correspond to a specified desired angle $\alpha$, which also describes the setting of the charging position. As a result of the axially symmetrical arrangement of the transmitters and of the receivers when the charging position is established with respect to the longitudinal axis of the vehicle, the charging position is described by $d=d_1=d_2$ and $\alpha=\alpha_1=\alpha_2$. In the case of a different type or geometrical arrangement of the transmitters and receivers, other desired angles will correspondingly occur for $\alpha_1$ and $\alpha_2$ as well as other desired distance for $d_1$ and $d_2$. When reaching the charging position, the travel trajectory describes a braking or stopping maneuver in order to bring the vehicle to a stop in the charging position.

According to a variant of one of the embodiments, the desired distance d and the desired angle α are optimized by a learn algorithm with an increasing number of carried-out charging operations in the direction of an increasing transmission efficiency.

According to a third embodiment, which represents a modification of the second embodiment, the primary coil itself acts as a receiver coil so that, in addition to the primary coil, the charging unit comprises no additional coil.

In the case of several adjacent charging units, their receivers can also be operated in an interconnected manner. This means that, for increasing the range, the receiver of a charging unit is used for the location determination of the vehicle with respect to a third charging unit. This requires that the positions of the several charging units with respect to one another are known to the access control device or can be transmitted to the latter.

The position determination by triangulation can also be used during a charging operation for checking whether the charging position is maintained.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system comprising:
a vehicle-external induction charging unit comprising a primary coil and a low-frequency receiving antenna; and
a vehicle comprising:
a secondary coil configured for inductive charging of the vehicle at the induction charging unit via the primary coil,
an automatic radio-based vehicle safety unit having at least two low-frequency transmitting antennas, and
an access control device configured to:
detect the spatial position of an access element relative to the vehicle based on the principle of electromagnetic distance and angle measuring between the transmitting antennas and a low-frequency receiver of the access element, and
detect the location position of the induction charging unit relative to the vehicle based on the principle of electromagnetic distance and angle measuring between the transmitting antennas and the receiving antenna,
wherein the access element is wirelessly coupled to the vehicle safety unit and is configured to permit user access to the vehicle when in the vicinity of the vehicle.

2. The system according to claim 1, wherein
for the inductive charging, the secondary coil takes up a charging position, which is situated in a preferred spatial position area of the secondary coil with respect to the primary coil, and
for establishing the charging position, the system detects a travel trajectory by means of the location position and the charging position, along which travel trajectory the charging position is taken up by the secondary coil.

3. The system according to claim 2, wherein
the access control device drives the at least two transmitting antennas,
the access control device comprises a first high-frequency communication unit,
the induction charging unit has an induction control device,
the induction control device comprises a second high-frequency communication unit,
the induction control device is assigned to the at least one receiving antenna as a measuring unit of the electromagnetic distance and angle measuring, and measures the induction signals of the at least one receiving antenna,
the induction signals are transmitted from the induction control device to the access control device, and
the access control device as the arithmetic unit detects the location position by triangulation by means of the induction signals.

4. The system according to claim 3, wherein
the access control device or a further control device of the vehicle detects the travel trajectory by means of the location position, and
the vehicle automatically carries out a driving maneuver corresponding to the travel trajectory, or the vehicle outputs a driving maneuver corresponding to the travel trajectory to the driver of the vehicle by way of a suitable human-machine interface.

5. A method carried out by the system according to claim 3, wherein the method comprises the acts of:
a) the first high-frequency communication unit sends out a coded search signal,
b) the induction control device receives the search signal and the second high-frequency communication unit sends out a coded confirmation signal to the access control device,
c) the access control device and the induction control device carry out an initialization routine between the at least two transmitting antennas and the at least two receiving antennas,
d) the at least two transmitting antennas emit a coded electromagnetic positioning signal, with respect to the vehicle coordinate system, the magnetic fraction of the positioning signal having a specified field orientation and a specific field intensity,
e) the at least one receiving antenna receives the at least two positioning signals of the at least two transmitting antennas, and the induction control device measures a magnetic field vector for each positioning signal, which magnetic field vector is unambiguously assigned to one of the at least two transmitting antennas by the coding of the positioning signal,
f) the induction control device transmits the magnetic field vector to the access control device,
g) according to the triangulation method, the access control device calculates the local position of the transmitting antennas with respect to the receiving antennas, which unambiguously describes the location position, h) the access control device or a further control device of the vehicle detects a travel trajectory, along which the charging position can be are taken up by the secondary coil.

6. A method carried out by the system according to claim 4, wherein the method comprises the acts of:
   a) the first high-frequency communication unit sends out a coded search signal,
   b) the induction control device receives the search signal and the second high-frequency communication unit sends out a coded confirmation signal to the access control device,
   c) the access control device and the induction control device carry out an initialization routine between the at least two transmitting antennas and the at least two receiving antennas,
   d) the at least two transmitting antennas emit a coded electromagnetic positioning signal, with respect to the vehicle coordinate system, the magnetic fraction of the positioning signal having a specified field orientation and a specific field intensity,
   e) the at least one receiving antenna receives the at least two positioning signals of the at least two transmitting antennas, and the induction control device measures a magnetic field vector for each positioning signal, which magnetic field vector is unambiguously assigned to one of the at least two transmitting antennas by the coding of the positioning signal,
   f) the induction control device transmits the magnetic field vector to the access control device,
   g) according to the triangulation method, the access control device calculates the local position of the transmitting antennas with respect to the receiving antennas, which unambiguously describes the location position,
   h) the access control device or a further control device of the vehicle detects a travel trajectory, along which the charging position can be are taken up by the secondary coil.

7. The method according to claim 5, wherein
   during a driving maneuver of the vehicle, acts d) to h) are repeated in real time in order to update the travel trajectory,
   when reaching the charging position, the updated travel trajectory will describe a stopping maneuver.

8. The method according to claim 6, wherein
   during a driving maneuver of the vehicle, acts d) to h) are repeated in real time in order to update the travel trajectory,
   when reaching the charging position, the updated travel trajectory will describe a stopping maneuver.

* * * * *